C. E. FORKNER.
ALFALFA TILLAGE MACHINE.
APPLICATION FILED MAR. 17, 1915.
1,189,554.
Patented July 4, 1916.
2 SHEETS—SHEET 1.
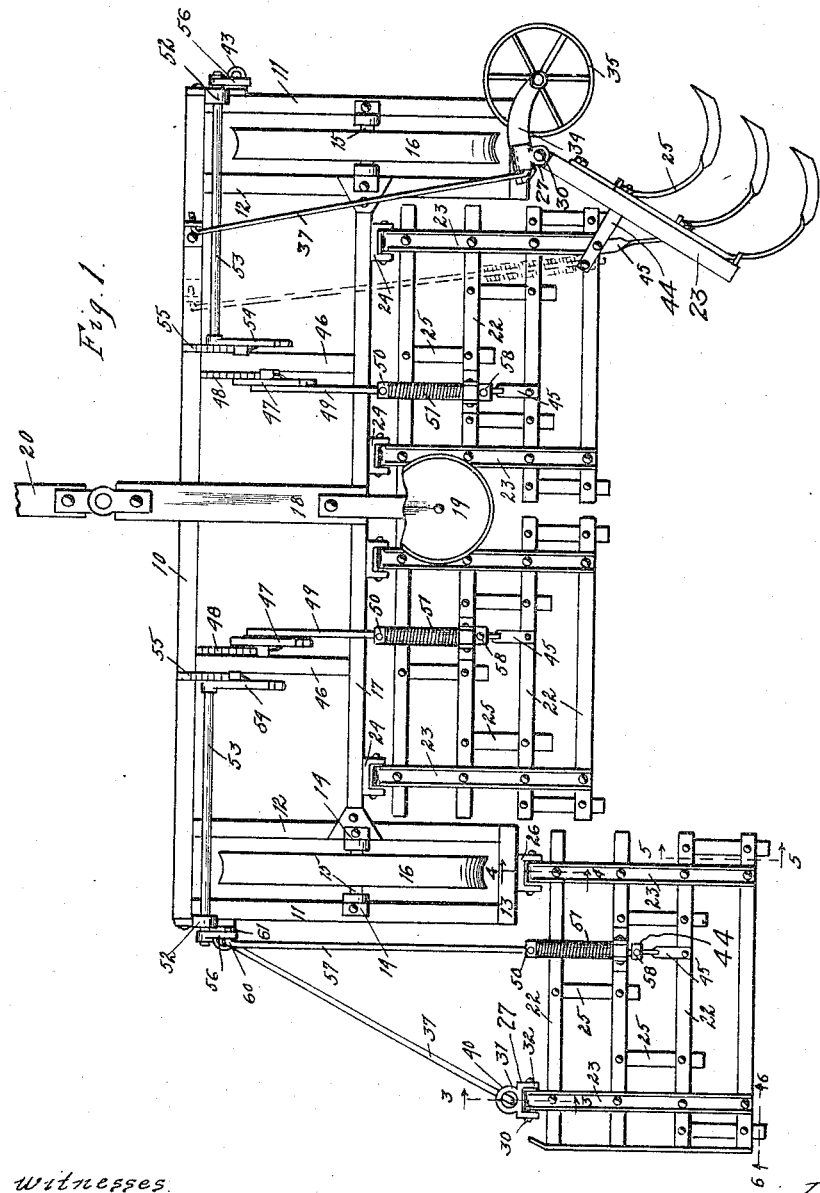

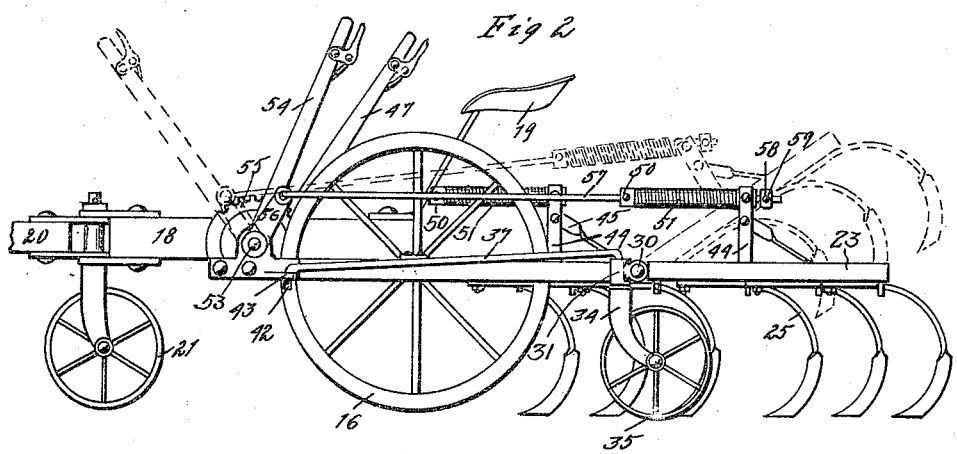

UNITED STATES PATENT OFFICE.

CHARLES E. FORKNER, OF MARSHALLTOWN, IOWA.

ALFALFA-TILLAGE MACHINE.

1,189,554.   Specification of Letters Patent.   Patented July 4, 1916.

Application filed March 17, 1915. Serial No. 15,080.

*To all whom it may concern:*

Be it known that I, CHARLES E. FORKNER, a citizen of the United States, and resident of Marshalltown, in the county of Marshall and State of Iowa, have invented a certain new and useful Alfalfa-Tillage Machine, of which the following is a specification.

The object of my invention is to provide an alfalfa tillage machine of simple, durable and inexpensive construction.

A further object is to provide a machine of this type having a frame and suitable supporting wheels, and having harrow sections properly mounted on the frame so that when the machine is in use some of the sections project laterally beyond the frame for cultivating a wide strip, the laterally projecting sections being so mounted as to be capable of being swung to positions where they do not project beyond the ends of the frame when it is desired to shorten the length of the machine.

A further object is to provide such a machine in which the laterally extending harrow sections are secured rearwardly as well as laterally of the frame.

A further object is to provide in such a machine suitable means for connecting the end harrow sections to the frame to accomplish the objects above referred to.

Still a further object is to provide in such a machine suitable means for controlling the harrow sections and lifting them, and also for imposing yielding pressure for forcing the teeth of the sections into the ground for regulating the depth of cut.

Still a further object is to provide an alfalfa tillage machine having a frame and harrow sections so connected thereto as to permit the harrow sections to make substantially the same depth of cut in spite of inequalities in the surface of the ground, thereby avoiding inequalities in depths of cultivation which occur where sections arranged in a row are secured to the same rigid bar.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of an alfalfa tillage machine embodying my invention, showing one of the end sections being tilted toward folded position. Fig. 2 shows a side elevation of the same, the dotted lines illustrating one of the sections in raised position and the means for controlling the raised section. Fig. 3 shows a detail, sectional view, taken on the line 3—3 of Fig. 1. Fig. 4 shows a detail, sectional view, taken on the line 4—4 of Fig. 1. Fig. 5 shows a detail, sectional view, taken on the line 5—5 of Fig. 1, and Fig. 6 shows a detail, sectional view, taken on the line 6—6 of Fig. 1.

My improved alfalfa tillage machine includes a frame having the front transverse member, which I have indicated in the drawings herewith exemplifying a form of my invention, by the reference numeral 10. At each end of the member 10 are spaced, parallel, rearwardly extending frame members, the outer and inner members of each pair respectively being indicated by the reference characters 11 and 12. The rear ends of each pair of members 11 and 12 are connected by short transverse members 13.

Mounted on the members 11 and 12 of each pair, near their middle parts, are opposite bearings 14. In the bearings of each pair is mounted an axle 15, on which is a supporting wheel 16. A transverse frame member 17 connects the members 12. The member 17 is preferably arranged substantially in line with the axles 15. Resting upon and connecting the members 10 and 17 is a longitudinally arranged frame member 18, which supports a seat 19, and to the forward end of which is pivoted the tongue member 20. Supporting the forward end of the member 18 is a caster wheel 21.

It will be understood that my improved alfalfa tillage machine may be made with the desired number of harrow sections. In the drawings herewith I have illustrated a machine having four sections, two of which are pivoted to the frame member 17.

Each harrow section comprises transverse frame members 22 which are connected by frame members 23 arranged longitudinally of the machine. The frame members 23 are pivoted to brackets 24 on the frame member 17, as illustrated in Fig. 1. In this connection it may be mentioned that the frame members 22 are preferably made of angle iron, as illustrated in Fig. 5, and that the frame members 23 are preferably channel bars.

Suitably mounted on the frame members 22 are spring teeth 25, which are preferably arranged substantially as shown in Fig. 1, the teeth of each harrow section being arranged substantially in the form of a V, with its point at the forward part of the harrow section and its open part at the rear of the harrow section. This arrangement of the teeth is for the purpose of making them as nearly self-cleaning as possible. Teeth arranged in this way will not collect trash.

I have tried various ways of mounting a number of harrow sections on a frame, and have found numerous disadvantages to exist where the sections are mounted upon a single rigid draw bar. Such a construction does not give as complete flexibility as may be desired, and where one end of such a tillage machine is tilted upwardly on account of inequalities in the ground, or downwardly, as the case may be, it is difficult if not impossible, to make the various sections to have an equal depth of cut. Where all of the sections are arranged in a row on a rigid draw bar there is also more jerking and unevenness of pull on the team or other source of motive power than is desirable.

The difficulties above mentioned I have avoided in my present machine by supporting the outside harrow sections rearwardly and laterally of the frame in a manner that will now be described.

The inner ends of the rearward outer sections are pivoted to the frame members 13. Secured to the member 13 is a bracket 26, having parallel, rearwardly extending, spaced arms 27. The bracket 26 is mounted on the member 13 by means of a bolt 28 on which the bracket 26 can be freely rotated. The forward end of the inner member 23 of the outer rearward harrow section is formed with a horizontal bearing 29 received between the portions 27 of the bracket 26. A bolt or pin 30 is extended through the members 27 and is mounted in the bearing 29.

It will be understood that both of the outer harrow sections are mounted in the same way, and it will be seen that they are thus capable of being tilted upwardly on the bolts 30 as pivots, and that their outer ends may be tilted upwardly and inwardly by rotation of the bracket 26 on the bolts 28.

The outer members 23 of the outer harrow sections are secured to the forward portions of the main frame in the following manner: At the forward end of the outer member 23 of each outer harrow section, is a bracket comprising a vertical bearing 31 having spaced, rearwardly extending, parallel arms 32. The forward end of the member 23 just mentioned has a bearing 29 similar to the one already described. A pin 30 such as has been described is mounted in the extension 32 and the bearing 29 of the outer member 23, which bearing is received between the rearward extensions 32. Mounted in the bearing 31 is a member 33. Formed on the lower end of the member 33 are parallel downwardly and rearwardly extending arms 34. Between the lower ends of the arms 34 is rotatably mounted a caster wheel 35. The member 33 is provided with a vertical, central opening 36 extending through it.

The outer end of each outer harrow section is connected with the forward portion of the frame by means of the rod 37 having at its rear end a downwardly extending portion 38 extended through the opening 36, and having a pin 39 extended through its lower end to hold the parts 38 and 33 in position. The bearing 31 is also provided with an upwardly extending portion 40 on its side adjacent to the main frame of the machine. On the upper forward portion of the part 40 is a finger 41, extending laterally away from the main frame of the machine, and adapted to extend over the rod 37 when the rod 37 is installed in its ordinary position. By swinging the rod 37 laterally away from the main frame, it can be moved to position where it can be moved upwardly and clear the finger 41.

The forward end of the rod 37 is bent downwardly at 42 and is extended through a loop 43 on the forward end of the member 11. The loop 43 is of such size as to allow considerable play of the extension 42.

I have found by extensive experiments that in a machine having its side sections secured rearwardly and laterally of the frame, as herein illustrated, there is considerably less tendency for the machine to jerk the team than is the case where the sections are secured in a transverse row to a single rigid draw bar.

In machines of this type it is necessary to place some parts of some of the sections either rearwardly or forwardly of the supporting wheels. I have in various experiments tried both forms of construction, and have found that a machine works steadier with a comparatively narrow frame with all of the sections suitably mounted thereon and slightly rearwardly, or at least with their main draft rearwardly of the axles.

The two central harrow sections of the form of machine illustrated in my drawings, are controlled in the following way: In the following description of the lever system it will be understood that I have simply illustrated one form of construction. Extending upwardly from the second member 22 from the front of the harrow section and referring now to all of the harrow sections, is an upwardly extending arm 44. The member 45 extends rearwardly and downwardly from the upper portion of the arm 44 to the next rearward frame member 22. The frame members 10 and 17 are connected by shorter longitudinal members 46, having parts adapted to coact with sectors 48. Connected with the levers 47 are rearwardly extending links 49 slidably mounted in the arms 44.

On the links 49 spaced from the arms 44 are collars 50. Mounted on the links 49 between the collars 50 and arms 44 are coil springs 51. It will be seen by throwing the levers 47 forward the rear portions of the two middle harrow sections may be tilted upwardly for raising their teeth from the ground. The teeth may be forced downward into the ground and the depth of their cut regulated by forcing the levers 47 rearwardly and increasing the tension on the springs 51.

Each side harrow section is controlled by the following described mechanism: On the members 46 and 11 are alined bearings 52. In the bearings 52 are mounted rock shafts 53. On the inner end of each rock shaft 53 is a lever 54 having parts adapted to coact with a sector 55. On the outer end of each rock shaft 53 is an upwardly and rearwardly extending arm 56. Pivoted to the arm 56 is a rearwardly extending link 57, slidably extended through the upwardly extending arm 44 on one of the outer harrow sections, and having on its rear end a collar 58 held in position by means of a set screw 59. On the link 57 in front of the arm 44 is a collar 50. Between the collar 50 and the arm 44 on each outer section is a spring 51. The forward end of the link 57 is detachably pivoted to the arm 56, preferably by means of the lateral extension 60 on which is a nut 61.

It will be seen that by swinging the lever 54 forwardly, the rear portion of one of the outer harrow sections may be tilted upwardly to cause its teeth to clear the ground, and that by moving said lever rearwardly spring pressure may be exerted upon such harrow section for forcing its teeth into the ground, and thereby regulating the depth of cut.

Attention is called to the extreme flexibility of my improved alfalfa tillage machine in its practical operation. It will readily be seen that if the caster wheel under one of the end harrow sections should strike a considerable rise in the ground, that particular section will be raised, but the rest of the harrow will continue to travel normally and make a normal cut, on account of the pivotal movement of the outer section on the bolt 28. It will also be seen that if one of the main wheels 16 should pass over an elevation or into a depression in the ground, the two outer harrow sections would be very little affected on account of the pivotal movement just referred to. It will, therefore, be seen that my harrow has extreme flexibility from end to end on account of the manner in which the two end sections are mounted on the frame so as to permit their being tilted from side to side as well as from their forward to their rearward ends.

It is desirable in tillage tools of this type to be able to cultivate a comparatively wide strip of land. At the same time it is important that the machine be so constructed that its width may be reduced when desired for passing through gates or between rows of trees, as in orchards or the like. It will readily be seen that on account of the manner in which the end sections of my harrow are secured to the main frame said end sections may be readily and easily swung to position where they do not project laterally beyond the ends of the main frame. The links 57 may be easily and quickly disconnected with the frame at their forward ends or with the members 44 at their rearward ends, as may be desired. The link 37 is very readily disconnected at its forward end. After the links 57 and 37 are thus disconnected, the outer end of the outer harrow section may be tilted upwardly and inwardly, as illustrated at the right hand side of Fig. 1. The outer section may then be swung forwardly if desired, to rest on one of the middle sections. It will readily be seen that when the outer section is thus tilted upwardly the forward end of the link 37 may be suitably secured to the main frame for holding the outer harrow section in its folded position.

I appreciate the fact that numerous changes may be made in the construction and arrangement of the parts of my improved alfalfa tillage machine without departing from its essential features and purposes, and it is my intention to cover by this application any such changes which may be included within the scope of my claims.

I claim as my invention:

1. In a device of the class described, a frame, supporting wheels at the ends thereof, a harrow section pivoted to the rear portion of the frame, and a harrow section mounted on the frame at the rear portion thereof, extending laterally beyond the frame and capable of being swung to position where it does not project laterally beyond the end of the frame.

2. In a device of the class described, a frame, supporting wheels at the ends thereof, a harrow section pivoted to the rear portion of the frame, a harrow section at the rear of the frame extending laterally therefrom, means for detachably securing the outer end of the front portion of said last harrow section to the forward portion of the frame at one end thereof, and means for securing the inner end of the front portion of the last named harrow section to the rear portion of the frame near one end thereof to permit universal movement of the section.

3. In a device of the class described, a frame, supporting wheels at the ends thereof, a harrow section pivoted to the rear portion of the frame, a harrow section mounted on the frame at the rear portion thereof, extending laterally beyond the frame and capable of being swung to position where it does not project laterally beyond the end of the frame, means for lifting the rear portions of said sections, and means for imposing yielding downward pressure thereon.

4. In a device of the class described, a frame, supporting wheels at the ends thereof, a harrow section pivoted to the rear portion of the frame, a harrow section mounted on the frame at the rear portion thereof, extending laterally beyond the frame and capable of being swung to position where it does not project laterally beyond the end of the frame, a caster-wheel under the outer end of said last section, means for lifting the rear portions of said sections, and means for imposing yielding downward pressure thereon.

5. In a device of the class described, a frame, supporting wheels at the ends thereof, a harrow section pivoted to the rear portion of the frame, a harrow section at the rear of the frame extending laterally therefrom, means for detachably securing the outer end of the front portion of said last harrow section to the forward portion of the frame at one end thereof, and means for securing the inner end of the front portion of the last named harrow section to the rear portion of the frame near one end thereof to permit universal movement of the section, a caster-wheel under the outer end of said last section, means for lifting the rear portions of said sections and means for imposing yielding downward pressure thereon.

6. In a tillage machine of the class described, a frame, supporting wheels at the ends thereof, inner harrow sections pivoted rearwardly of the frame between the wheels, outer harrow sections rearwardly of the frame and extending laterally beyond it, means for pivoting the inner forward parts of the outer sections to the frame to permit universal movement of the outer sections, caster-wheels below the forward outer ends of the outer sections, means for detachably securing said forward outer ends to the forward part of the frame to permit lateral and longitudinal tilting of the outer sections, and means for raising the rear ends of the sections and for imposing yielding downward pressure thereon.

CHARLES E. FORKNER.

Witnesses:
J. MAHER,
A. SHERMAN.

Copies of this patent may be obtained for five cents each, by addressing the "Commissioner of Patents, Washington, D. C."